Aug. 13, 1929.                       C. H. DEREN                     1,724,567
                                     TIRE GAUGE
                                 Filed July 11, 1927

Inventor
Charles H. Deren

By Clarence A. O'Brien
                 Attorney

Patented Aug. 13, 1929.

1,724,567

UNITED STATES PATENT OFFICE.

CHARLES HENRY DEREN, OF BROOKLYN, NEW YORK, ASSIGNOR TO OSCAR EDWARD TEPE, OF BROOKLYN, NEW YORK.

TIRE GAUGE.

Application filed July 11, 1927. Serial No. 204,898.

This invention relates to tire pressure gauges adapted particularly for pneumatic tires and comprises essentially an air chuck having a valve stem coupling and air hose connection formed at one end thereof with a tire pressure gauge housing integrally formed at its opposite end. The invention has for its principal object to provide an air chuck such as is commonly used for the inflation of pneumatic tires which may be removably secured to the valve stem of the tire without requiring the services of the operator in retaining the same in position thereon and provided with a suitable connection for attaching either a hand operated pump or a motor driven pump and having a pressure gauge integrally formed therewith and arranged to indicate the pressure of the air within the tire.

A further object is to arrange an air relief valve upon the chuck and having adjustable means by which the same may be set to permit the inflation of the tire up to a predetermined pressure and operating to release the air entering the chuck beyond such pressure.

A further object is to provide a device of this character of simple and practical construction efficient and reliable in performance, relatively inexpensive to manufacture, and otherwise well adapted for the purposes for which the same is intended.

Other objects and advantages reside in the special construction and arrangement of parts, reference being had to the accompanying drawings forming a part hereof, wherein.

Figure 1:
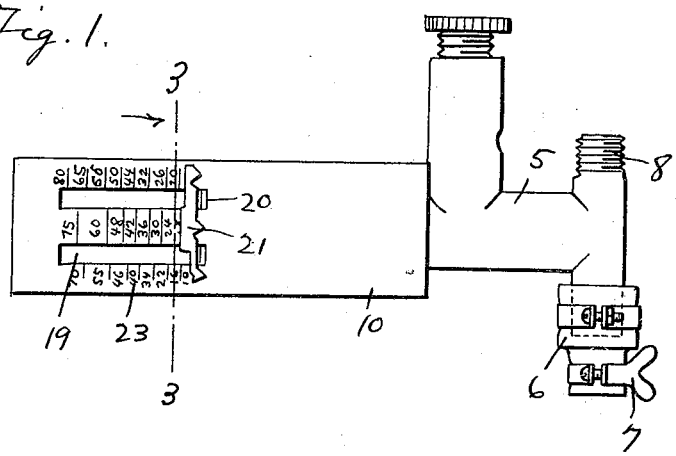
Figure 1 is an elevational view of my combined tire inflating chuck, pressure gauge and pressure regulating valve.
Figure 2:
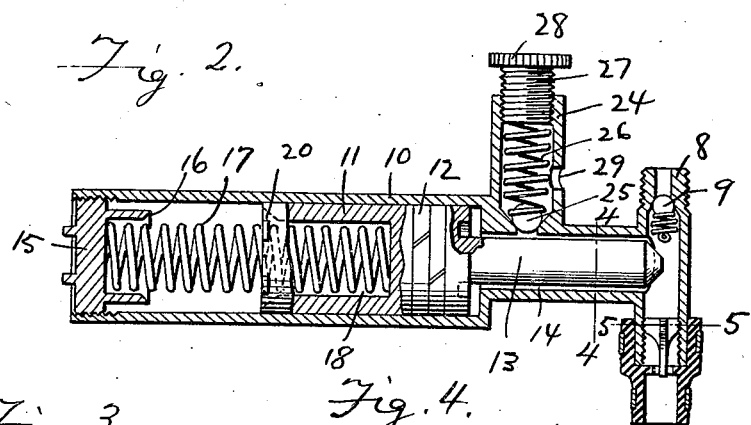
Figure 2 is a longitudinal sectional view therethrough.
Figure 3:
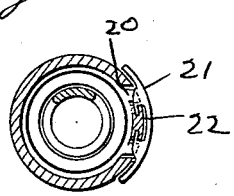
Figures 4, 5:
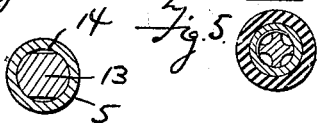

Figure 3 is a transverse sectional view through the tire gauge taken along a line 3—3 of Figure 1, Figure 4 is a transverse sectional view taken along a line 4—4 of Figure 2, and, Figure 5 is a similar view taken along a line 5—5 of Figure 2.

Referring now to the drawing wherein for the purpose of illustration I have shown a preferred embodiment of my invention, I provide an air chuck 5 of a type suitable for the inflation of pneumatic tires and of hollow construction throughout, with a valve stem coupling 6 arranged at an opening in one end of the chuck, said coupling being constructed of elastic material, such as rubber, whereby to form a tightened fit upon the stem and having a tightening clamp 7 arranged to removably secure the coupling in position thereon. The end of the chuck having the valve stem coupling is also provided with a threaded connection 8 for attaching an air hose thereto for supplying air under pressure to the chuck from either a hand operated pump or a motor driven pump. A check valve 9 is arranged in the connection 8 preventing the escape of air outwardly therethrough.

The opposite end of the air chuck is formed into a substantially cylindrical tire pressure gauge housing 10 having a piston 11 slidably arranged therein and provided with piston rings 12 forming a tight fit between the piston and the cylinder walls. A stem 13 is formed on one end of the piston and arranged to extend longitudinally in the bore of the chuck and forming a tight fit with the walls thereof at opposite sides, said stem being provided with longitudinally extending flattened faces along its upper and lower edges providing air passages 14 throughout the length of the chuck.

The outer end of the tire pressure gauge housing 10 is open and arranged to threadedly receive a pressure adjusting plug 15 having an annular flange 16 formed at its inner end within which to receive one end of a coil spring 17, the opposite end of which is seated within a recess 18 formed in the adjacent end of the piston 11. The outward movement of the piston thereby is restricted by the tension of the spring 17.

A pair of longitudinally extending slotted openings 19 is formed near the outer end of the housing 10 through which are slidably inserted laterally extending lugs 20 formed on the piston 11. A pressure indicating arm 21 is slidably arranged on the outside of the housing 10 having guides 22 slidably arranged in grooves formed at the edges of the slotted openings 19, the lugs 20 formed on the piston being arranged to engage the arm 21 whereby to move the same longitudinally of the housing simultaneously with the piston. A pressure indicating scale 23 is arranged on the outside of the housing 10 adjacent the slotted openings 19 and coacting with the arm 21 to indicate the pressure of the air within the tire.

A pressure release valve is also carried by the chuck, comprising a valve chamber 24 integrally formed on the chuck and extending laterally therefrom with the interior of the chamber communicating with the air passage within the chuck and having a ball valve interposed therein indicated at 25 and retained in position to normally close the passage therebetween by a coil spring 26. A tension regulating means is provided for the spring comprising a plug 27 threadedly carried in the end of the housing provided with a knurled operating nut 28. An exhaust port 29 is formed in the valve chamber to permit the escape of air therefrom.

In the operation of the air relief valve the tension of the spring 26 may be regulated to a desired extent for actuation at a predetermined air pressure and as soon as the tire has been inflated to such pressure the ball 25 will be removed from its seat thus permitting the escape of air from the chuck and preventing the over inflation of the tire.

It is apparent that the tire pressure gauge will operate gradually with the inflation of the tire and indicate at all times the exact pressure within the tire during the inflating operation and without necessitating the removal of the chuck from the valve stem of the tire. The plug 15 carried in the end of the tire gauge housing permits the adjustment of the gauge whenever the same may be found necessary, due to changes in temperature which may affect the fit between the piston and the cylinder walls of the housing or due to wear upon such parts by continual use.

It is obvious that the invention is susceptible to various changes in size, shape and form, and I accordingly claim all such forms of the device to which I am entitled.

I claim:

A pressure gauge having an air duct formed at one end thereof to cooperatively associate the gauge with the object gauged, said gauge comprising a cylinder having its walls integrally formed with the walls of the duct and communicating with said duct, a piston operatively arranged within the cylinder and adapted for actuation by air pressure within the duct, said piston having a recess in its end remote from its pressure actuated end, a cap threadedly carried at the outer end of the cylinder having a flange projecting longitudinally in said cylinder, a coil spring tensionally retained within the cylinder having its opposite ends seated respectively within said recess and within the walls of said flange for restraining movement of said piston, said cylinder having a pair of slotted openings arranged longitudinally therein, and a pair of pressure indicating fingers carried by the piston and slidably arranged in said openings and cooperating to indicate the amount of air pressure in the duct, in accordance with the extent of movement of the fingers in said opening.

In testimony whereof I affix my signature.

CHARLES HENRY DEREN.